United States Patent
Venes et al.

(10) Patent No.: US 8,164,501 B2
(45) Date of Patent: Apr. 24, 2012

(54) METHOD AND SYSTEM FOR TIME INTERLEAVED DIGITAL TO ANALOG CONVERSION FOR A CABLE MODEM

(75) Inventors: Arnoldus G. Venes, Laguna Niguel, CA (US); Kevin L. Miller, Lawrenceville, GA (US); Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1050 days.

(21) Appl. No.: 10/975,106

(22) Filed: Oct. 28, 2004

(65) Prior Publication Data
US 2006/0098823 A1 May 11, 2006

(51) Int. Cl.
*H03M 1/66* (2006.01)
(52) U.S. Cl. ........ 341/144; 341/118; 341/120; 341/155; 375/257; 375/258; 375/265; 375/295
(58) Field of Classification Search .......... 341/144–154, 341/118, 120, 155; 375/257, 258, 265, 295
See application file for complete search history.

(56) References Cited

U.S. PATENT DOCUMENTS

| | | | |
|---|---|---|---|
| 5,537,113 A * | 7/1996 | Kawabata | 341/141 |
| 5,892,474 A * | 4/1999 | Sugawara | 341/200 |
| 6,201,486 B1 * | 3/2001 | Chan et al. | 341/61 |
| 6,271,777 B1 * | 8/2001 | Lentine et al. | 341/100 |
| 6,356,224 B1 * | 3/2002 | Wohlfarth | 341/147 |
| 6,489,908 B2 * | 12/2002 | Panasik et al. | 341/144 |
| 6,531,975 B1 * | 3/2003 | Trotter et al. | 341/144 |
| 6,801,591 B1 * | 10/2004 | Frencken | 375/373 |
| 6,922,109 B2 * | 7/2005 | Fallahi et al. | 331/2 |
| 6,925,130 B2 * | 8/2005 | Chan | 375/295 |
| 7,049,872 B2 * | 5/2006 | Diorio et al. | 327/276 |
| 7,079,064 B1 * | 7/2006 | Bell et al. | 341/144 |
| 7,253,760 B2 * | 8/2007 | Yamashita | 341/144 |
| 2001/0026179 A1 * | 10/2001 | Saeki | 327/147 |
| 2002/0009170 A1 * | 1/2002 | Schmatz | 375/371 |
| 2003/0185327 A1 * | 10/2003 | Chen | 375/371 |
| 2009/0052556 A1 * | 2/2009 | Fernandez | 375/241 |

* cited by examiner

*Primary Examiner* — Linh Nguyen
(74) *Attorney, Agent, or Firm* — Sterne, Kessler, Goldstein & Fox P.L.L.C.

(57) ABSTRACT

Provided is a transmitter in a communications system including a plurality of digital to analog converters. Also included is a plurality of clocks, each being communicably coupled to a corresponding one of the digital to analog converters.

20 Claims, 3 Drawing Sheets

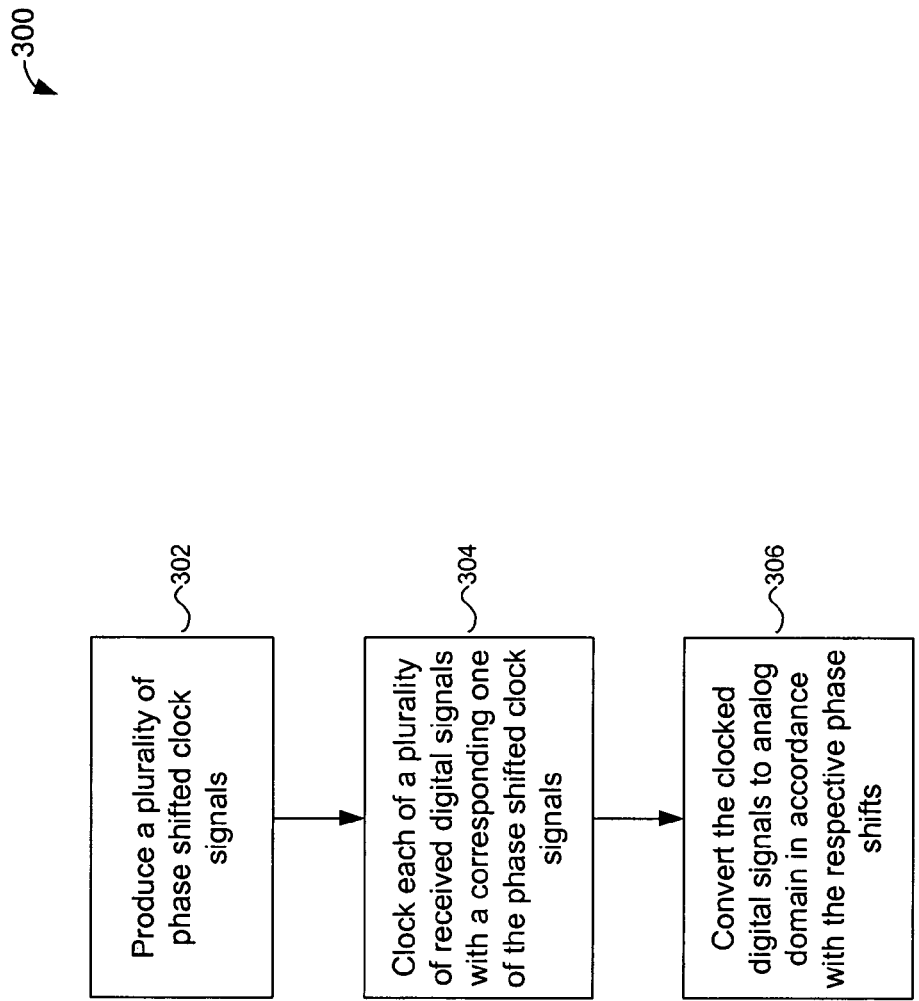

METHOD AND SYSTEM FOR TIME INTERLEAVED DIGITAL TO ANALOG CONVERSION FOR A CABLE MODEM

BACKGROUND OF THE INVENTION

1. Field of the Invention

The present invention generally relates to digital to analog conversion in a communications system transmitter.

2. Background Art

An increasingly popular standard in conventional communication systems is the Data Over Cable Service Interface Specification (DOCSIS). Communications systems that comply with these standards, particularly DOCSIS upstream standards, typically include transmitters that have a single digital to analog converter (DAC). Each of these transmitters, mainly used in upstream communication channels, typically includes a low-pass filter coupled to an output of its DAC and a power amplifier connected to an output of the anti-aliasing filter.

The anti-aliasing filter is provided to minimize aliasing components in the output signals. The power amplifier is provided to achieve the DOCSIS recommended output power level of about 58 dBmV (decibel millivolts).

An additional (Euro) DOCSIS requirement is the ability to achieve a DAC output signal frequency of roughly 65 megahertz (MHz). That is, in conventional upstream (Euro) DOCSIS based transmitters, a single DAC must be able to run at a sampling rate of at least 130 MHz according to general sampling theory (Nyquist Theorem).

Significant challenges exist in using anti-aliasing filters and power amplifiers in the manner noted above. The greatest of these challenges is that the power amplifiers typically used are relatively large in size. At low DAC sampling rates, e.g. 130 MHz, an expensive anti-aliasing filter is required and this filter may also attenuate the desired output signal, therefore requiring even higher output power from the power amplifier to compensate for these losses. The large size power amplifier is responsible for the consumption of significant amounts of integrated circuit (IC) real estate, or one may need to use an external power amplifier to generate the required high output power.

What is needed therefore is a method and system of converting digital signals to analog domain in a manner that minimizes aliasing components in the output signal. What is also needed is a method and system that can also achieve or exceed the output power requirements of standards, such as DOCSIS.

BRIEF SUMMARY OF THE INVENTION

Consistent with the principles of the present invention as embodied and broadly described herein, the present invention includes a transmitter in a communications system, including a plurality of DACs. Also included is a plurality of clocks each being communicably coupled to a corresponding one of the DACs.

The present invention provides a unique technique for running multiple time-interleaved DACs in a communications system transmitter to achieve 4× over-sampling. This over-sampling translates into enhanced DAC resolution and performance.

An exemplary embodiment of the present invention, described below, facilitates the use of multiple 10-bit time-interleaved DACs. The time-interleaved aspect occurs in the sense that multiple DACs operate off separately and independently phased clocked signals.

In the present invention, multiple 10-bit DACs can achieve the same resolution as the single 11-bit DAC. Thus, the approach of the present invention enables four time-interleaved 10-bit DACs to gain an additional 1-bit improvement in resolution over the individual DACs running separately and provide a savings in IC real estate.

An important benefit of the present invention is virtual elimination of the need of anti-aliasing filters. That is, the present invention minimizes the production of aliasing components output from the DAC that fall within DOCSIS frequency bands of interest.

For example, it is well understood by those of skill in the art that conventional DACs produce undesirable spurious tones close to the DAC's sampling frequency. In the exemplary case of a DAC running at 400 MHz and producing a signal having an output frequency of 50 MHz, spurious tones will be produced at 400 MHz (which is the clock frequency) minus 50 MHz (i.e., at 350 MHz) and at 400 MHz plus 50 MHz (i.e., at 450 MHz). There will also be tones at 750 MHz (800 MHz−50 MHz) and 850 MHz (800 MHz+50 MHz), and so on. In essence, undesirable spurious tones are produced at multiples of the DAC's sampling rate.

These spurious tones fall directly within the operational bands of traditional cable television (TV) channels and create interference. The DOCSIS specification requires suppression of this interference, hence the use of the anti-aliasing filters, noted above. In the conventional systems, substantial anti-aliasing filtering is required in the upstream channels to ensure that these images, as well as any related harmonics, are sufficiently suppressed.

An embodiment of the present invention substitutes four DACs for the single DAC (used in conventional implementations) running at a sampling rate of 525 MHz. In the present invention, the four DACs produce a sampling rate of 2.1 gigahertz (GHz). In this case of an embodiment of the present invention and a 50 MHz output frequency, the first spurious (aliasing) tone is produced at 2.05 GHz (2.1 GHz−50 MHz) and 2.15 GHz (2.1 GHz+50 MHz) instead of 350 and 450 MHz. Since the operational upper bandwidth of cable television channels only reaches about 1 GHz, the spurious tones produced in exemplary embodiments of the present invention, do not interfere with cable TV since they fall outside of the operation bandwidth.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings:

FIG. 3 is an exemplary flowchart of a method of practicing an embodiment of the present invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
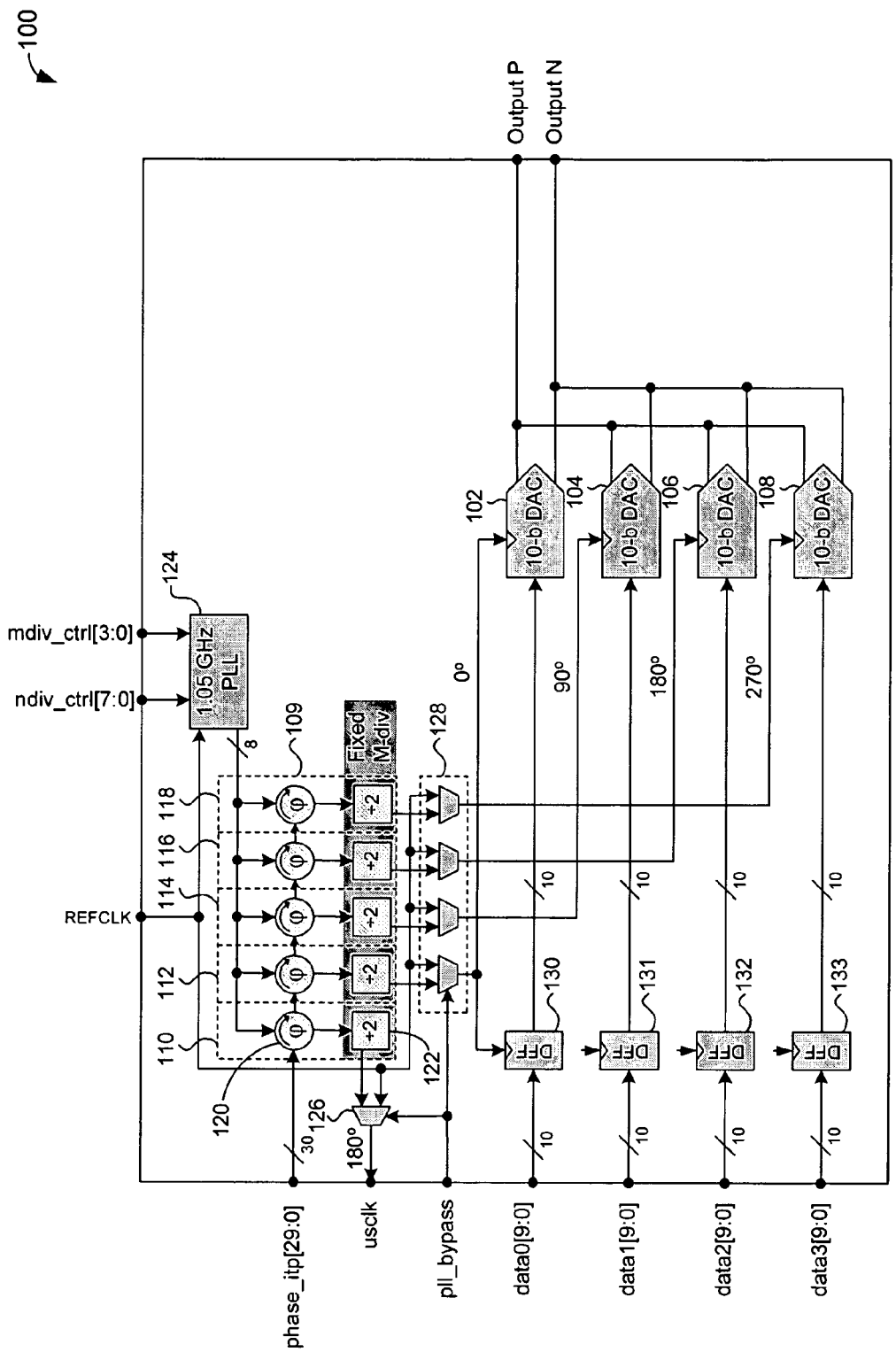
FIG. 1 is a high level block diagram illustration of a digital to analog converter (DAC) system constructed in accordance with an embodiment of the present invention.

FIG. 1 is an illustration of an exemplary PowerDAC 100 constructed in accordance with an embodiment of the present invention. The PowerDAC 100 includes a quad time-interleaved DAC architecture for use in a modem, such as a cable modem, used in a transmitter. This transmitter can in turn be used in an upstream channel of a DOCSIS based communications system.

In the exemplary embodiment of FIG. 1, four 10-bit DACS 102, 104, 106, and 108 are used. The clock frequency of each of the DACs 102-108 is skewed by 90°, effectively providing a four-fold over-sampling data conversion system. Input data words data0-data3 are provided as respective inputs to the four DACs 102-108. The input data words data0-data3 are generated by a digital interpolation filter (not shown).

Although the DACs 102-108 are implemented as 10-bit DACs, the present invention is not limited to such an implementation. In the present invention, the combination of the four exemplary 10-bit DACs 102-108 provides an output resolution equivalent to the output of a single 11-bit DAC. That is, the effective sampling rate of four time-interleaved DACs, such as the DACs 102-108, is four times higher than the sampling frequency of any one of the individual DACs.

As an example, one conventional transmitter DAC implementation might require a single 11-bit DAC to run at 500 MHz. The cycle time for this conventional implementation would be two nano-seconds (1/500 MHz). In the PowerDAC system 100 of FIG. 1, the 10-bit DACs 102-108, are 4×time-interleaved (i.e., having an update rate of 500 pico-seconds) to behave as the single 11-bit DAC in the exemplary conventional implementation. Running at 500 MHz, four time-interleaved DACs results in the single PowerDAC 100 having a 2 GHz sampling rate. Due to the higher sampling rate of the present quad interleaved configuration, DAC aliasing images no longer fall within the cable bands of interest (e.g., a >860 MHz), as explained above.

In FIG. 1, the DACs 102-108 are connected to a timing generation unit 109. The timing generation unit 109 controls phasing of the input data words data0-data3, respectively input to each of the DACs 102-108. The timing generation system 109 includes individual clock generators 110, 112, 114, 116 and 118.

The exemplary clock generating unit 110 provides clock phasing for an upstream clocking signal (usclk) provided as an output signal to control digital logic (not shown) external to the PowerDAC system 100. Each of the remaining clock generators 112-118 is coupled to a respective one of the DACs 102-108. The upstream clocking signal (usclk) provides a time-base for the DACs 102-108.

Each of the clock generators 110-118 includes a phase interpolator and a corresponding fixed divider circuit. The clock generator 110, for example, includes a phase interpolator 120 coupled to a divider circuit 122. The clock generators 112-118 shifts a phase of a respective one of input data words by a multiple of 90°.

Each of the phase interpolators, such as the phase interpolator 120, provides an individual phase offset for its corresponding divider circuit, such as the circuit 122.

In more specific terms, the exemplary phase interpolators, such as the phase interpolator 120 in the PowerDAC 100, allow independent clock timing adjustments for each of the four DACs 102-108. They also allow independent adjustments for the output clock signal (usclk). Each of the phase interpolators has a 6-bit control word, and hence allows a timing grid of $1/(64 \times F_{vco})$ where $F_{vco}$ is the output frequency of a variable controlled oscillator (not shown) within the PLL 124.

The exemplary divider 122 is implemented as a divide-by-2 DAC, although the present invention is not limited to this implementation. A divide-by-2 implementation was chosen because it makes it easier to generate four equally spaced clock phases for the DACS 102-108. Timing and phasing of the clock generators are provided by a phase locked loop (PLL) device 124.

In particular, the PLL device 124 provides synchronization, multiplication and phasing stability between an input reference clock signal (refclk) and the signals input to the clock generators 110-118. The PLL 124 receives inputs from an M-divider control word (mdiv_ctrl) and an N-divider control word (ndiv_ctrl). The control words provide programmability for certain timing components within the PLL 124. A multiplexer 126, in conjunction with a bank of multiplexers 128, enables a user to selectively bypass operation of the PLL 124 if conditions so dictate.

The control words (mdiv_ctrl and ndiv_ctrl) in conjunction with the input clock signal refclk, are used in accordance with known techniques, to control a frequency of a frequency word output from the PLL 124. The clocking mechanism 109 shifts a phase of the input data words data0-data3 respectively input to the DACs 102-108.

The conversion unit 100 also includes flip-flops 130-133, which receive the data words data0-data3, respectively coupled across data paths to the DACs 102-108. The flip-flops 130-133 provide a mechanism to interface and synchronize data being received from external circuit components, with operation of the PowerDAC 100. Although the flip-flops shown in FIG. 1 are implemented as D-flip-flops, the present invention is not limited to such an implementation.

During operation, the exemplary PowerDAC unit 100 receives the data signals data0-data3 as inputs. The data0 signal, for example, is clocked by a signal received from the clock generator 112. The signal output from the clock generator 112 has a "0" degree phase shift, and is provided as an input clock to the DAC 102. Similarly, the data1 input signal is clocked by a clocking signal output from the clock generator 114 to produce a 90° phase shifted signal. The 90° signal is provided as an input clock to the DAC 104. The data2 and data3 input signals are clocked in a similar manner to respectively provide input signals having phases of 180° and 270° respectively. These phase shifted signal are then as inputs to the DAC 106 and DAC 108, respectively.

In this manner, the DACs 102-108 operate in a quad time-interleaved manner to convert the input data signals data0-data3 from digital domain to analog domain. Outputs of the DACs 102-108 are then combined, forming a single analog differential analog output signal (output P and output N).

The present invention is not limited to the use of multiple clock generators. That is in another embodiment, all of the DACs 102-108 can be run off of a single clock. Running multiple DACs off of a single clock generator would still provide the benefits of higher output power compared to a single DAC, as discussed above.

Similarly, many other combinations of clock generators and DACs can be used. For example, to further optimize power and timing benefits, eight DACs could be run in groups of two off of four clock generators. Alternatively, the eight DACs could be run off of a single clock generator. The present invention is not limited to any particular number of DACs or any particular number of clock generators.

Figure 2:
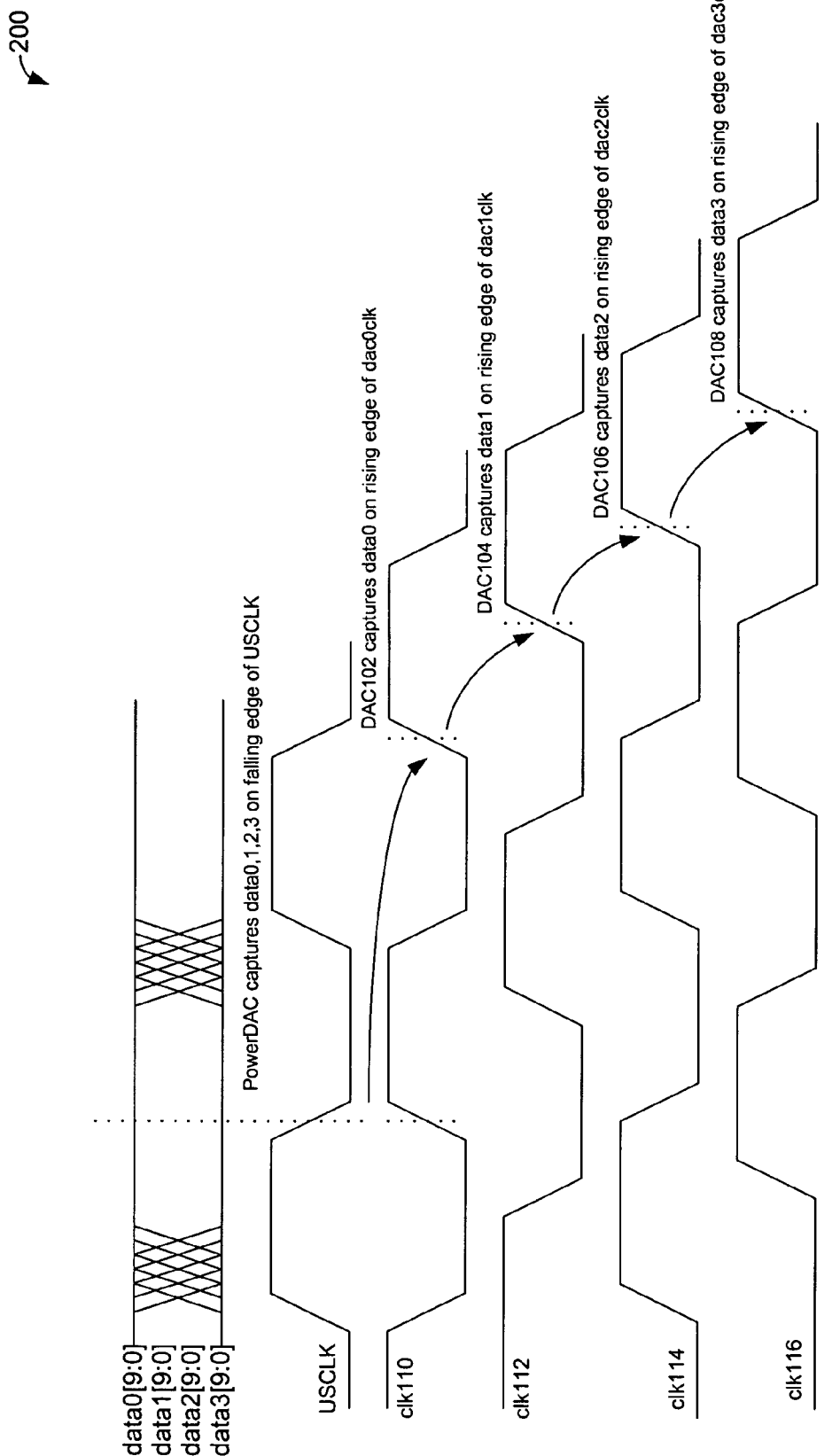
FIG. 2 is a graphical illustration of exemplary timing signals used in the illustration of FIG. 1.

FIG. 2 is a graphical illustration of an exemplary timing diagram 200 of timing associated with the data signals data0-data3. In FIG. 2, each of the input data signals data0-data3 is captured in a manner equally spaced in time. For example, each of the input data signals data0-data3 is captured on a falling edge of the input clock signal usclk, as shown.

In FIG. 2, the DAC 102 captures data0 on a rising edge of the clock 110, and the DAC 104 captures data1 on a rising edge of the clock 112. The DACs 106 and 108 similarly correspondingly capture data2 and data3 on respective rising edges of the clocks 114 and 116.

In an exemplary scenario the DACs 102-108 can each be run for example, at 500 MHz. Although four DACs are used, the present invention is not limited to four DACs. However, in the exemplary embodiment of the PowerDAC unit 100 of FIG. 1, a full clock cycle is 2 nanoseconds, and thus adjacent DACs have a clock timing delay of 500 picoseconds.

The outputs of the DACs 102-108 are summed together. Because the effective update rate is now 500 picoseconds and not 2 nanoseconds, as noted above, the first spurious tone will show up at about 2 GHz, rather than 500 MHz. In case of a clock signal delay mismatch (e.g., 600 picoseconds delay for one DAC) there will images showing up at 500 MHz, although initial simulations show that a result is still significantly better than having a single DAC operating at 500 MHz. This is apparent since individual DAC errors are averaged across the power of four DACs.

Another advantage of the present invention is the overall upstream signal- to-noise ratio (SNR). At full power, the 10-bit DACs 102-108, of the exemplary embodiment of FIG. 1, together will effectively provide the dynamic range and resolution of an 11-bit DAC (4xover-sampling).

FIG. 3 is an exemplary flowchart of a method 300 of practicing an embodiment of the present invention. In FIG. 3, a plurality of phase shifted clock signals is produced in step 302. In step 304, each of a plurality of received digital signals is clocked with a corresponding one of the phase shifted clock signals. The clocked digital signals are then converted to analog domain in accordance with the respective phase shifts, as indicated in step 306.

Conclusion

The present invention provides a method and system for a quad time interleaved DAC architecture for use in a cable modem transmitter. By skewing the clock frequency of each of the DACs 102-108 by 90°, the four exemplary 10 bits DACs 102-108 effectively provide the processing resolution of a single 11 bit DAC. That is, the improved SNR, due to four fold over-sampling, enhances the DAC resolution by 1 bit.

In the present invention, the total amount of output power is the result of a summation of power from the individual DACs in the DAC array. This is advantageous for the system performance and required real estate (chip area) compared to a single DAC system.

Also, in the exemplary embodiment of FIG. 1, each of the four DACs is operating at a sampling frequency at 500 MHz, ultimately resulting in a 2 GHz powerDAC. Due to the higher sampling rate, DAC aliasing images no longer fall within operational cable bands, such as above 860 MHz.

The open loop style implementation of the DACs 102-108 and other circuitry provides adequate system stability, easing board and package design. Higher output power is possible, as long as the DACs can support the higher current levels. Fully digital control of power on and power off ramp time constants help to reduce electromagnetic interference and increase power integrity.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What we claim is:

1. A transmitter in a communications system, comprising:
   a plurality of digital to analog converters (DACs);
   an input of each DAC within the plurality (i) being respectively coupled to an output of only one corresponding phase adjuster and (ii) configured to receive an output from the phase adjuster and a corresponding digital input signal; and
   only one phase-locked loop coupled to the plurality of DACs and the phase adjusters;
   wherein outputs of the DACs are combined to form a single output analog signal representative of the digital input signals.

2. The transmitter of claim 1, wherein the communications system includes a cable modem; and
   wherein the cable modem includes the transmitter.

3. The transmitter of claim 1, wherein the cable modem is deployed in an upstream communications channel.

4. The transmitter of claim 1, further comprising:
   a plurality of clock generators each being communicably coupled to a corresponding one of the DACs, wherein each clock generator provides a clock signal at a first frequency originating from the phase-locked loop to its corresponding DAC.

5. The transmitter according to claim 4,
   wherein each of the provided clock signals is shifted in phase from all of the other clock signals such that an effective sampling rate of the plurality of DACs is a multiple of the first frequency.

6. The transmitter according to claim 5, wherein each of the phases of the provided clock signals differs from the other phases by a multiple of about 90 degrees.

7. The transmitter according to claim 6, wherein the plurality of DACs are configured to provide time-interleaved conversion.

8. The transmitter according to claim 7, wherein each of the clock generators includes a divider circuit.

9. The transmitter according to claim 8, wherein the divider circuit is configured to divide by an integer multiple of two.

10. The transmitter according to claim 8, wherein each of the clock generators includes a phase interpolator couple to the divide circuit.

11. The transmitter of claim 4, wherein each of the DACs is of a 10 bit variety.

12. The transmitter of claim 4, wherein the communications system includes a cable modem.

13. The transmitter of claim 12, wherein the cable modem is a deployed in an upstream communications channel.

14. A method comprising:
 producing a plurality of phase shifted clock signals, each clock signal originating from a corresponding phase adjuster, all of the phase adjusters being coupled to only one phase-locked loop;
 clocking each of a corresponding plurality of received external input digital signals with a corresponding one of the phase shifted clock signals; and
 providing each of the clocked digital input signals and the corresponding phase shifted clock signals as an input to a corresponding digital to analog converter (DAC), the DACs being coupled to the phase adjusters and the phase-locked loop, outputs of the DACs being combined to form a single output analog signal representative of the digital input signals.

15. The method of claim 14, wherein each of phases of the phase shifted clock signals differs from a phase of all of the other signals by a multiple of about 90 degrees.

16. The method of claim 14, wherein the producing step comprises:
 interpolating a plurality of clock signals originating from the phase-locked loop; and
 dividing each of the plurality clock signals to create the phase shifted clock signals.

17. The method of claim 14, wherein an effective sampling rate of the plurality of received digital signals is a multiple of a frequency of the phase shifted clock signals.

18. The method of claim 17, wherein the effective sampling rate is a product of the frequency of the phase shifted clock signals and a number of received digital signals in the plurality of received digital signals.

19. The transmitter of claim 1, wherein an effective sampling rate of the plurality of DACs is a product of a first frequency and a number of DACs in the plurality of DACs.

20. The transmitter of claim 4, wherein an effective sampling rate of the plurality of DACs is a product of a first frequency and a number of DACs in the plurality of DACs.

* * * * *